United States Patent

[11] 3,582,219

[72] Inventors Josef Pfeifer
 Unterhaching;
 Horst Bickl, Munich, both of, Germany
[21] Appl. No. 758,077
[22] Filed Sept. 6, 1968
[45] Patented June 1, 1971
[73] Assignee Agfa-Gevaert Aktiengesellschaft
 Leverkusen, Germany
[32] Priority Oct. 27, 1967
[33] Germany
[31] P 15 97 079.3

[54] LIGHT MEASURING MEANS FOR MICROFILM CAMERAS
10 Claims, 4 Drawing Figs.

[52] U.S. Cl. .................................................. 356/202,
 356/203, 356/205, 365/236, 250/234, 250/235
[51] Int. Cl. .................................................. G01n
 21/06, G01n 21/22, G01n 21/16
[50] Field of Search........................................ 356/202,
 203, 219, 226, 227, 236, 319, 273—375; 250/234,
 235

[56] References Cited
 UNITED STATES PATENTS
2,430,253 11/1947 Simmon et al. ............ 356/203X
2,821,103 1/1958 Blet........................... 356/236X
2,842,025 7/1958 Craig........................ 356/203X
2,843,003 7/1958 Baker........................ 250/235X
3,130,634 4/1964 Kropp et al. ............. 356/202X
3,186,295 6/1965 Cuffey....................... 356/203
3,296,368 1/1967 Lohmann................... 356/203X
3,355,590 11/1967 Bertram..................... 250/235X
3,424,534 1/1969 Miller et al. .............. 356/203
3,455,637 7/1969 Howard..................... 356/204

FOREIGN PATENTS
813,481 5/1959 Great Britain............ 356/202

OTHER REFERENCES
"Joyce Instrumentation Catalogue", Dec. 1961, 356/202

Primary Examiner—Ronald L. Wibert
Assistant Examiner—Warren A. Sklar
Attorney—Arthur O. Klein ABSTRACT: A device for adjusting a microfilm camera so as to achieve uniform illumination at the film gate to expose film in the film plane. The camera has a support means for supporting a film cassette, and the device of the invention includes a baseplate carried by this support means and formed with a gate opening corresponding to that provided by a cassette. A light-sensing means is carried by the baseplate for sensing at predetermined points in the film plane the intensity of light which passes through the gate opening of the baseplate. A moving means is operatively connected with the light-sensing means to move the latter with respect to a pair of mutually perpendicular coordinates. The light-sensing means includes at least one photocell which provides a signal corresponding to the light intensity, and distant from the light-sensing means is a light-indicating means coacting with the light-sensing means to indicate in response to the signal from the photocell the light intensity sensed by the light-sensing means.

INVENTORS:
JOSEF PFEIFER
HORST BICKL

BY Arthur O. Klein their Attorney

LIGHT MEASURING MEANS FOR MICROFILM CAMERAS

BACKGROUND OF THE INVENTION

The present invention relates to microfilm cameras.

In particular, the present invention relates to a device for adjusting a microfilm camera to achieve a uniform illumination at the film gate thereof by way of a light-sensing means which includes at least one photocell.

In order to achieve a uniform darkening of a microfilm negative, it is necessary to adjust the illumination of the item which is to be photographed in correspondence with the reflection characteristics of this latter item and in accordance with the light-distributing characteristics of the optical imaging structure which provides at the film pane the image which registers on the film. In general, several microfilm negatives are measured with a microdensitometer, so that between the individual test exposures the illumination can be adjusted according to the darkness deviations appearing after development of the test exposures. This process of making test exposures, developing them, and then making corresponding adjustments is carried out until a satisfactory darkening of a test negative is achieved. Of course, a process of this type is relatively inconvenient and consumes a large amount of time.

It is possible to calculate the required light density for the item which is to be photographed, taking into consideration the vignetting of the imaging objective and the extent of which light falls off at the edge region thereof, and the calculated value may then be adjusted by means of a light measuring device for measuring the light intensity at various points. However, this method also requires manipulation of a relatively large part of the influencing factors, such as absorption, lens errors, and reflections in the path of light.

SUMMARY OF THE INVENTION

It is accordingly a primary object of the invention to provide a structure capable of adjusting the light received by a microfilm camera while avoiding the above drawbacks.

A more particular object of the invention is to provide a construction which makes it possible to carry out the required adjustments in a single operation so that several successive operations involving exposure, developing and checking of test negatives and the like, can be avoided.

Also, it is an object of the invention to provide a construction which makes it possible for the operator to very clearly and conveniently see the light intensity resulting from the adjustments.

Also, it is an object of the present invention to provide a construction which is capable of indicating the light intensity directly at the film plane.

Furthermore, it is an object of the invention to provide for a construction of the above type a photosensitive structure which operates in such a way that the results achieved with the structure of the invention are for the most part independent of the characteristics of the photosensitive structure itself.

Also, it is an object of the invention to provide a construction of the above type which is capable of indicating the light intensity at any desired points of the image plane.

Furthermore, it is an object of the invention to provide a construction of the above type which can be remotely controlled.

The objects of the invention also include providing a construction which makes it possible for the operator to check the light intensity of a series of points at the film plane in an extremely convenient manner from any desired convenient location with the equal possibility of making required corrections in a rapid and extremely convenient manner.

Furthermore, it is an object of the invention to provide a construction which operates in a manner independent of the particular angle at which a light ray passes through the film gate to the film plane, so that it is possible, for example, to achieve accurate light intensity readings even at the edge regions of the image field.

Also, it is an object of the invention to provide a construction where dispersed light is received by a photosensitive element, with this dispersed light having essentially a spherical characteristic.

The objects of the present invention also include the provision of a structure which makes it possible to very accurately and conveniently adjust preselected light sources corresponding to given areas.

In accordance with the invention, the support which normally carries a film cassette carries a baseplate formed with a gate opening corresponding to that of the cassette and carrying at the film plane a light-sensing means which is shiftable with respect to a pair of mutually perpendicular coordinates for testing, point-by-point, the light intensity in the plane which the film, to be subsequently exposed, is located. This light-sensing means controls an indicating structure which is situated distant from the light-sensing means and which indicates the light intensity. For the purpose of shifting the light-sensing means, there is a moving means which actuates a pair of signal-transmitting means which transmits signals corresponding to the location of the light-sensing means with respect to the pair of coordinates, and a position-indicating means, also distant from the moving means and light-sensing means, is provided to be actuated by a pair of signal-transmitting means for indicating the location of the particular point where the light is sensed by the light-sensing means.

BRIEF DESCRIPTION OF DRAWINGS

The invention is illustrated, by way of example, in the accompanying drawings which form part of this application and in which.

DESCRIPTION OF A PREFERRED EMBODIMENT

Figure 1:
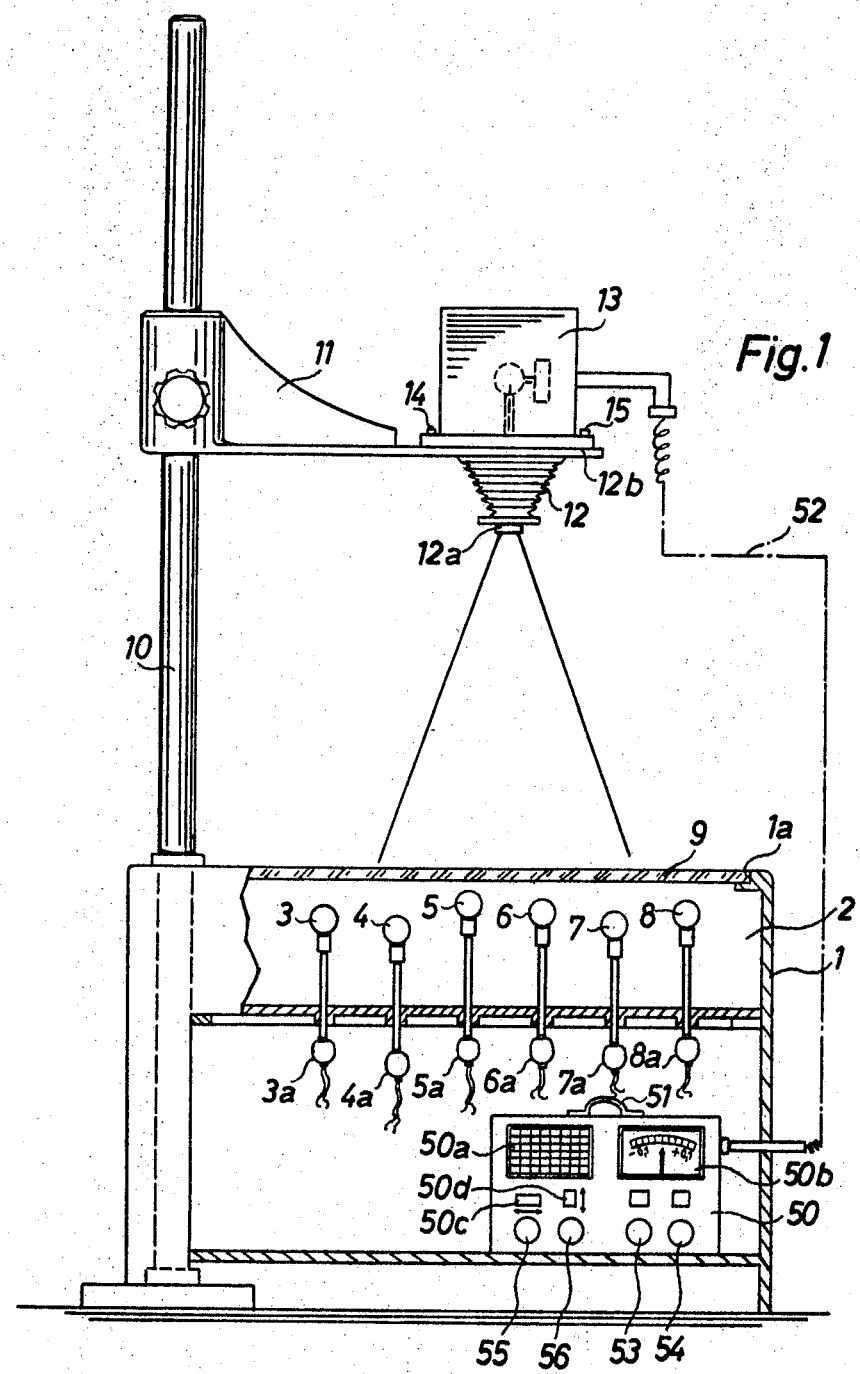
FIG. 1 is a partly sectional schematic elevation of a microfilm camera structure provided with the adjusting device of the invention.

Referring now to FIG. 1, the structure illustrated therein includes a frame structure 1 which forms a light box 2 which in a known way has in its interior lamps 3—8 which are capable of being manually adjusted in elevation by way of hand grips 3a—8a, respectively, so that it is possible in this way to adjust localized light intensities in the plane of the sheet material which is to be photographed. Thus, the lamps 3—8 illuminate a ground glass plate or other matted or frosted glass plate 9 which is situated in the upper opening 1a of the frame structure 1. The item which is to be photographed is to be placed on the plate 9.

The frame 1 also carries a column which is fixed to the fame 1 and which supports for elevational adjustment a support means 11 in the form of a bracket adapted to carry the camera. This support means 11 carries the camera 12 which has the objective 12a, and the region 12b of the camera forms part of this support means 11 and is adapted to carry the cassette which has in its interior the film which is to be exposed. In accordance with the invention, instead of a cassette a measuring unit 13, described in detail below, is mounted on the support means 11 during adjustment of the light. In order to hold the measuring unit 13 on the support means 11, bayonet pins 14 and 15 or any other conventional holding structure is provided to hold a cassette in a predetermined position with respect to the camera 12.

Figure 2:
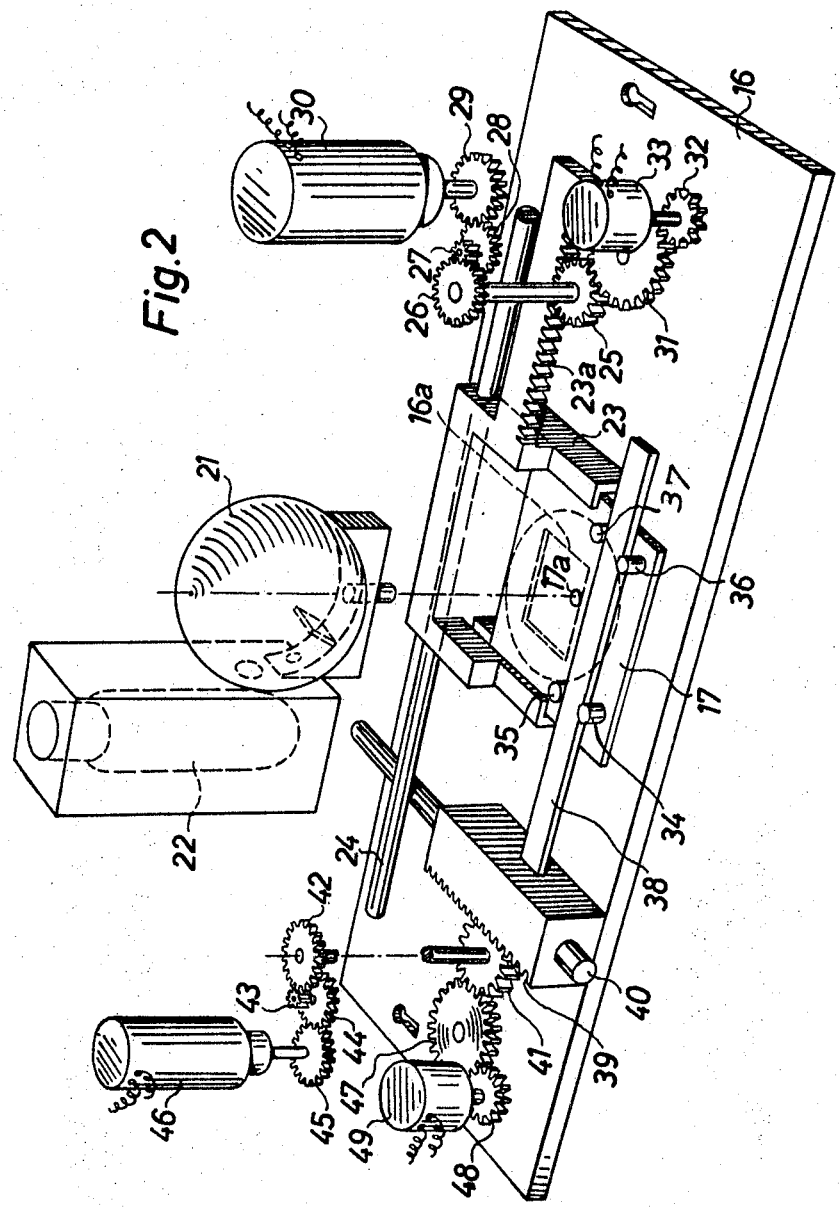
FIG. 2 is a perspective exploded view of the light-measuring device.
Figure 3:
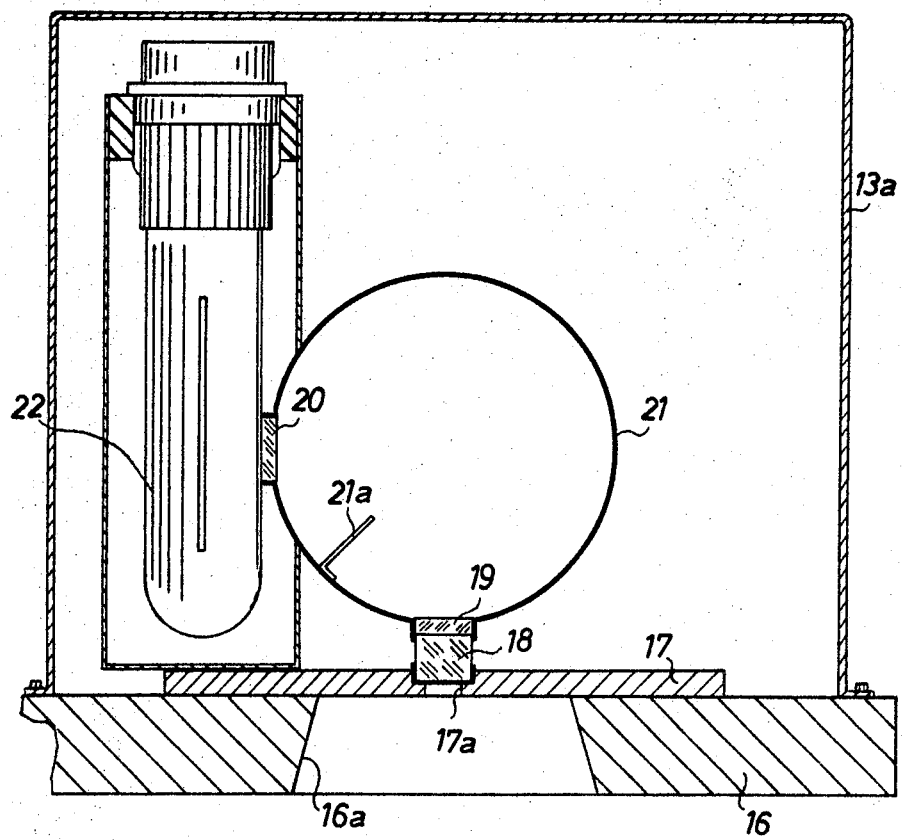
FIG. 3 is a sectional schematic elevation taken in a plane passing through the light-measuring device.
Figure 4:
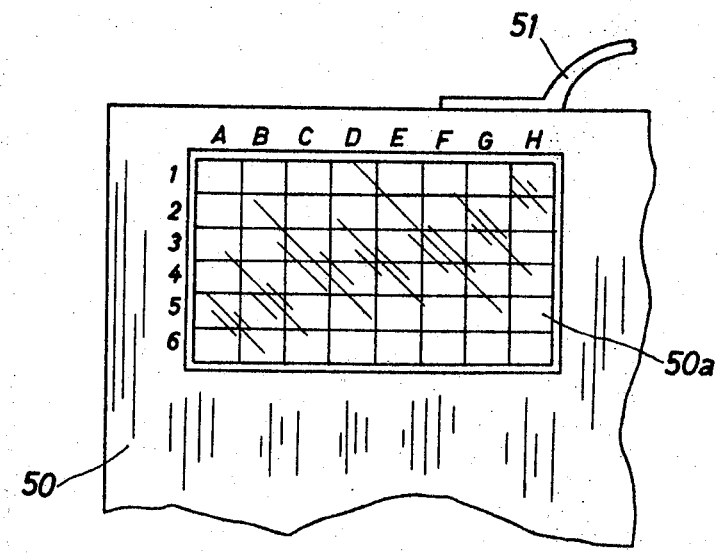
FIG. 4 is a schematic partial elevational view illustrating the manner in which the position indicating means is divided by means of a pair of coordinates to indicate the location of the particular point where the light is sensed by the light-sensing means.

As may be seen from FIGS. 2 and 3, the measuring unit 13 includes a baseplate 16 formed with a gate opening 16a which corresponds precisely to the film gate of a cassette which is normally provided to expose film. Thus, this opening 16a forms a gate for testing purposes.

The base plate 16 carries a light-sensing means for sensing light which passes through the gate opening 16a to the film plane which of course is situated directly at the inner end of the film gate. This light-sensing means includes a plate 17 which is movable along the upper surface of the baseplate 16 and which carries a photo-SEV 22 in the form of a photocell for changing the light which it received into an electrical current of a magnitude corresponding to the light intensity, as is well-known. The plate 17 is formed with an entrance aperture for the light which is received by the light-sensing means, and for this purpose the plate 17 is provided with a circular aperture 17a covered by a light-conducting bar 18 which in turn carries a light-dispersing disc 19. A second light-dispersing disc 20 is located directly next to the photocell 22, and the pair of light-dispersing discs 19 and 20 are respectively set into openings of an Ulbricht sphere 21. A diaphragm or aperture member 21a is situated within the sphere 21 to prevent light from passing directly from the disc 19 to the disc 20. The entire light sensing means is shielded from the exterior by the housing 13a in a light-tight manner.

A moving means is provided for moving this light-sensing means with respect to a pair of mutually perpendicular coordinates, and for this purpose the plate 17 actually forms a carriage for the light-sensing means, this carriage being movable in perpendicular directions parallel to the pair of coordinates. For this purpose the moving means includes a guide 23 which guides the plate 17 for forward and rearward movement, as viewed in FIG. 2, while the guide 23 is itself guided, by a rod 24 which is fixed to the baseplate 16, for movement to the right and left, as viewed in FIG. 2. A rack 23a is fixed directly to the carriage guide 23 and meshes with the output gear 25 of a transmission 25—29 in the form of a gear train driven by a synchronous motor 30, the gear 29 being the input gear of the transmission which is directly driven by the motor 30.

A signal-transmitting means is provided for transmitting a signal indicative of the position of the guide 23 and carriage plate 17 along the coordinate which is parallel to the guide rod 24, and this signal transmitting means includes a gear train 31, 32 having the gear 31 meshing with the gear 25 and the gear 32 meshing with the gear 31 and actuating the potentiometer 33, so that the variable resistance of the latter will be indicative of the position of the light-sensing means along the rod 24 or the coordinate which extends in the same direction as the rod 24.

The plate 17 is provided with pins 34—37 which are fixed to and project upwardly from the plate 17 and which provide a guide for an elongated bar 38 which extends parallel to the rod 24. Thus, during movement of the guide 23 along the rod 24 the pins 34—37 move along the bar 38. This bar 38 is fixed to a second rack 39, guided for movement along a rod 40 which is carried by the baseplate 16 and which is perpendicular to the rod 24. Thus, movement of the rack 39 along the rod 40 will result in the displacement of the bar 38 toward or away from the rod 24 to shift the carriage 17 with respect to the guide 23 along a coordinate perpendicular to that provided by the rod 24. A gear train 41—45 has its output gear 41 meshing with the rack 39 and its input gear 45 is driven directly by a second synchronous motor 46. A second signal-transmitting means is provided by way of meshing gears 47 and 48 and the potentiometer 49. The gear 47 meshes with the gear 41 while the gear 48 is directly connected to the potentiometer 49 so that the variable resistance of the latter will indicate the position of the light-sensing means along the other coordinate.

As is schematically indicated in FIG. 1, the measuring unit 13 described above is electrically connected by way of a flexible conductor 52 with an indicating and control unit 50 provided with a handle 51 and set up at any desired location in the region of the microfilm camera distant from the unit 13. The indicating and control unit 50 is provided with a position-indicating means 50a in the form of an oscillograph tube whose deflection amplifier for both coordinates is electrically connected with both potentiometers 33 and 49. The photocell 22 is electrically connected with the microammeter 50b which thus forms a light-indicating means for indicating the light intensity, and in addition the unit 50 has control switches 50c and 50d which are provided for controlling the operation of the synchronous motors 30 and 46. The unit 50 further has a manually turnable adjusting knob 53 for zeroing purposes, a manually turnable adjusting know 54 for adjusting the sensitivity of the light-indicating means 50b, and a pair of adjusting knobs 55 and 56 for the purpose of adjusting the brightness and focus of the oscillograph tube 50a. The visible surface of the position indicating means 50a is provided with intersecting lines which divide the visible surface into predetermined areas. The plate 9 is provided with corresponding intersecting lines defining areas visible from below by a person adjusting the position of the lamps 3—8, which match and correspond to those provided at the surface of the position-indicating means 50a.

The above-described structure operates as follows:

In order to adjust the structure so as to achieve a uniform light intensity in the gate opening 16a by means of the vertically adjustable lamps 3—8, the indicating and control unit 50 which is electrically connected with the measuring unit 13 by way of the flexible conductor cable 52 is set up at a location where it is easily accessible and easily visible during adjustment of the lamps 3—8. The entrance aperture 17a of the measuring unit 13 is shifted by actuation of the switches 50c and 50d to different locations of the film gate 16a, where the light from the lamps 3—8 after passing through the camera objective 12a reaches the photocell 22, after passing through the light-conducting bar 18, the light-dispersing discs 19 and 20, and the Ulbricht sphere 21.

The amount of light which is received by the photocell will provide a corresponding deflection of the pointer of the microammeter 50b. At the same time, by way of the pair of signal-transmitting means formed by the potentiometers 33 and 49, the particular position of the measuring point where the light is sensed is indicated at the oscillograph 50a. The operator is thus in a position to carry out adjustments of whichever one of the lamps 3—8 corresponds to the indicated location of the light-sensing point until the deflection of the pointer of the microammeter 50b corresponds to the desired light intensity. Of course, it is also possible in precisely the same way to provide adjustment of a structure which provides top-lighting with the light traveling downwardly from an upper location.

It is advantageous to connect the microammeter 50b into the circuit in the form of a zero-compensating instrument and to calibrate the microammeter directly in the density units. A deflection of the pointer of the microammeter to the right can, for example, indicate a corresponding film density greater than 1.0, while deflection of the pointer to the left will indicate a corresponding film density of less than 1.0. Since the desired tolerance is in the range of ±0.05 density units from the density 1.0, the region of the scale from 0.95 to 1.05 is marked red. When, upon movement of the aperture 17a in the film or image plane, the extent of deflection of the pointer of the meter remains in the red region, the light density profile or variations has been adjusted at the plate 9 in a manner corresponding to required tolerances.

This method can be used for any desired points in the film plane at gate 16a until throughout the entire film gate a uniformity of the light intensity within the above tolerance limits prevails. Naturally, it is also possible, for future control of the light intensity, to connect in a known manner to the light-sensing means a scribing line recorder which will record and indicate the movement of the light-sensing means over the film gate 16a by means of the synchronous motor 30 or the synchronous motor 46, so as to record and indicate the variations in light density over a predetermined section of the film gate. In the event that such an indication of the light density profile or variation is not provided, it is also naturally possible to use instead of synchronous motor 30 and 49, any desired electric motors which are of a lesser operating accuracy.

Thus, with the above-described structure of the invention the measuring of the light intensity takes place directly at the film or image plane, so that, as in the case of the test negative, all of the factors which influence the light intensity at the film gate are taken in consideration automatically. However, in contrast to the known methods, the adjustment with the present invention is carried out in a single operation, so that the indicating unit 50 which is separate from the light-sensing means, in accordance with the invention, can be set up to indicate the location and light intensity of a given measuring point in such a way that during the adjustment the light intensity is rendered easily visible to the operator. This feature is particularly of importance when, as is often the case, adjustment of the lamps can take place only from beneath the apparatus. Moreover, the indication unit of the invention provides, in contrast to test-exposure methods where it is possible to determine the degree of darkness of the test negative only after developing of the image received thereby, a direct indication of the light-intensity variations actually occuring in the image plane. As a result of the use of a single shiftable photocell with the zero compensation for the direct measurement of the light intensity at the film gate, the indication is, moreover, to a very large extent independent of the characteristic of the photocell 22.

As was indicated above, the light-sensing means of the invention is mounted on a carriage movable in a pair of mutually perpendicular directions with respect to both of the coordinates where the signal-transmitting means 33 and 49 are capable of indicating the position of the light-sensing means with respect to these coordinates. The pair of potentiometers 33 and 49 which are thus controlled by the carriage movement preferably serve as a voltage dividing structure for the deflection amplifier of the oscillating tube. As a result of using potentiometers as devices for transmitting position signals, there is provided in the simplest possible manner a fully linear indication of the position of the point where the light is measured, particularly when the voltage taken from the potentiometers is used to supply an oscillograph tube provided in a conventional manner with a counter-coupled, direct voltage differential amplifier.

Further conveniences are achieved by way of the remote control of the synchronous motors by the switches in the control unit 50, these controls switches for the synchronous motors being advantageously situated directly at the position indicating unit.

By situating the position of indicating means and the light-indicating means for indicating the light intensity in a common housing which is connected by the flexible conductor to the measuring unit, it becomes possible for the operator to see at a single glance from any desired location the indication of the position and the light intensity at the latter position, and of course, it is also equally convenient for the operator to make the required corrections.

Of course, the proper functioning of the device of the invention is based on the assumption that the light-sensing means will have a precisely determined measuring point independent of the particular angle of the light rays even at the edge regions of the image field, to achieve an accurate measurement of the light intensity. It is for this reason that the light-sensing means of the invention is provided with the entrance aperture 17a for the point-by-point sensing of the light intensity in the image plane, this aperture being connected to the photosensitive element 22 by way of the light-conducting structure in the form of the light-dispersing means situated between the aperture 17a and photocell 22 and taking the form of the Ulbricht sphere and the light dispersing discs. A particularly high degree of independence of the measurements from the angle of the light rays is achieved by making use of an Ulbricht sphere for the light-dispersing means, because the dispersed light is given an essentially spherical characteristic in this manner.

The visible division lines on the ground glass support 9 and on the visible surface of the position-indicating means 50a, which correspond to each other to provide corresponding areas at both of these surfaces, makes it possible to read at the position-indication means 50a, in an outstandingly efficient manner, the particular lamp field which is to be adjusted.

Although the invention is illustrated and described with reference to one preferred embodiment thereof, it is to be expressly understood that it is in no way limited to the disclosure of such a preferred embodiment, but is capable of numerous modifications within the scope of the appended claims.

What We claim is:

1. In a device for adjusting light received by a microfilm camera to achieve uniform illumination at a film gate of the camera for exposing film at the film plane, comprising support means for supporting a film cassette, a baseplate carried by said support means and formed with a gate opening corresponding to the film gate of the camera, light-sensing means situated in the film plant to sense the intensity of light passing through said gate opening to the film plane, said light-sensing means including at least one photocell for providing a signal corresponding to the light intensity sensed by said light-sensing means, moving means coacting with said light-sensing means for moving the latter in the film plane, with respect to a pair of mutually perpendicular coordinates, for sensing the light intensity at predetermined points in the film plane, light-indicating means distant from said light-sensing means and operatively connected thereto to be actuated by said signal for indicating a measurement of the light intensity at a point at which said light-sensing means is located, a pair of signal-transmitting means coacting with said moving means for transmitting therefrom a pair of signals indicative of the position of said light-sensing means with respect to said pair of coordinates, and position-indicating means also situated distant from said moving means and light-sensing means and coacting with said pair of signal-transmitting means for indicating the location, in the film plane, of a point where said light-sensing means is located to sense the light intensity, said position-indicating means includes an indicating surface divided by intersecting lines into a first plurality of predetermined areas, carrier means for carrying in a predetermined plane an item which is to be photographed, said predetermined plane of said carrier means being divided by intersecting lines into a second plurality of predetermined areas corresponding to the first plurality of predetermined areas, and illuminating means mounted in said carrier means for illuminating said item to be photographed, Said illuminating means comprising a plurality of adjustable lights, each of said lights being positioned to illuminate a respective area of said second plurality of predetermined areas of said item to be photographed, whereby each of said lights may be adjusted to illuminate said respective area of said second plurality of predetermined areas of said item to be photographed in accordance with the measurement indicated by said light-indicating means.

2. The combination of claim 1 and wherein said moving means includes a carriage carrying said light sensing means and movable in directions respectively parallel to said mutually perpendicular coordinates, said pair of signal-transmitting means respectively being in the form of a pair of potentiometers which respectively respond to movement of said carriage for indicating at said positon-indicating means the position of said light-sensing means.

3. The combination of claim 2 and wherein position-indicating means is in the form of an oscillograph tube having a deflection amplifier and said pair of potentiometers coacting with said deflection amplifier to act as voltage divider therefor.

4. The combination of claim 2 and wherein said moving means includes a pair of remotely controlled synchronous motors for moving said carriage in said directions, respectively.

5. The combination of claim 4 and wherein said position-indicating means carries a pair of control switches for respectively controlling said synchronous motors.

6. The combination of claim 1 and wherein said baseplate, light-sensing means, and moving means together form a measuring unit and said light-indicating means and position-indicating means forming an indicating unit, said indicating unit having a common housing for both of said indicating means, and a flexible conductor interconnecting said units for providing coaction therebetween.

7. The combination of claim 1 and wherein light-sensing means includes an entrance aperture for receiving light at a selected point of the film plane, and said light-sensing means further including light-directing structure for directing light from said aperture to said photocell.

8. The combination of claim 7 and wherein light-diffusing components form part of said light-directing structure and are located in the path of light from said aperture to said photocell.

9. The combination of claim 8 and wherein said light-diffusing components include an Ulbricht sphere.

10. The combination of claim 1, comprising means for adjustably positioning the lights on the carrier means.